(12) United States Patent
Ben-Ezra et al.

(10) Patent No.: US 9,660,943 B2
(45) Date of Patent: May 23, 2017

(54) MESSAGING BASED SIGNALING FOR COMMUNICATIONS SESSIONS

(71) Applicant: International Business Machines Corporation, Armonk, NY (US)

(72) Inventors: Asaf Ben-Ezra, Acco (IL); Joseph E. Bergmark, Durham, NC (US); Scott W. Graham, Boulder, CO (US); Nitzan Nissim, Tel-Aviv (IL); Brian Pulito, Lexington, KY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 477 days.

(21) Appl. No.: 14/261,689

(22) Filed: Apr. 25, 2014

(65) Prior Publication Data

US 2015/0312177 A1 Oct. 29, 2015

(51) Int. Cl.
*H04L 12/58* (2006.01)
*G06F 15/16* (2006.01)
(Continued)

(52) U.S. Cl.
CPC ............ *H04L 51/043* (2013.01); *H04L 51/04* (2013.01); *H04L 51/046* (2013.01);
(Continued)

(58) Field of Classification Search
CPC ............................ H04L 51/043; H04L 67/141
(Continued)

(56) References Cited

U.S. PATENT DOCUMENTS 8,543,665 B2 9/2013 Ansari et al.
2010/0312898 A1 12/2010 Jokela et al.
(Continued)

FOREIGN PATENT DOCUMENTS

WO 2009/080096 7/2009
WO 2013/006839 1/2013

OTHER PUBLICATIONS

List of IBM Patents or Patent Applications Treated as Related, Mar. 12, 2015.
(Continued)

*Primary Examiner* — Suraj Joshi
(74) *Attorney, Agent, or Firm* — IBM End IPLaw

(57) ABSTRACT

According to one embodiment of the present invention, a system for providing call signaling services to client devices transmits a start channel message on a service topic from a first client device to a service instance. The system publishes from the service instance to the client devices a channel message including a channel topic. The service instance subscribes to the service topic and an associated channel topic. Each client device subscribes to a corresponding client topic. The system transfers signaling information between the client devices and the service instance by publishing signaling information to a channel topic and client topics to establish a communication channel between the client devices. The system communicates between the client devices by publishing information over the communication channel. Embodiments of the present invention further include a method and computer program product for providing call signaling services in substantially the same manners described above.

20 Claims, 5 Drawing Sheets

(51) Int. Cl.
*H04L 29/08* (2006.01)
*H04L 29/06* (2006.01)

(52) U.S. Cl.
CPC ........ *H04L 65/104* (2013.01); *H04L 65/1006* (2013.01); *H04L 65/1069* (2013.01); *H04L 65/608* (2013.01); *H04L 67/02* (2013.01); *H04L 67/141* (2013.01); *H04L 67/147* (2013.01); *H04L 67/26* (2013.01); *H04L 67/2809* (2013.01); *H04L 67/42* (2013.01)

(58) Field of Classification Search
USPC .......................................................... 709/206
See application file for complete search history.

(56) References Cited

U.S. PATENT DOCUMENTS

| | | |
|---|---|---|
| 2013/0013704 A1 | 1/2013 | Pope et al. |
| 2014/0019626 A1 | 1/2014 | Hubler et al. |
| 2014/0044123 A1 | 2/2014 | Lawson et al. |

OTHER PUBLICATIONS

Sarantorn Bisalbutra, Publish/Subscribe Gateway for Real-Time Communication, Thesis for Degree of Master of Science in Aalto University, Aalto University School of Electrical Engineering, Nov. 19, 2012.
Pubnub, Inc., Push Notifications & Socket Connections for Realtime Apps, http://www.pubnub.com/how-it-works/data-streams/, 2009-2014, accessed Apr. 23, 2014.
Alan B Johnston and Daniel C Burnett, WebRTC: APIs and RTCWEB Protocols of the HTML5 Real-Time Web, Third Edition, Digital Codex LLC, Mar. 11, 2014, pp. 19-32 and 80-138.

MESSAGING BASED SIGNALING FOR COMMUNICATIONS SESSIONS

BACKGROUND

Present invention embodiments relate to signaling for real-time communications sessions, and more specifically, to scalable signaling-services based on publish-subscribe messaging.

Real-time communications (RTC) technologies for voice over interact protocol (VOIP), video conferencing, and the like use separate communication channels for transferring control information (referred to as signaling) and transferring content, such as voice or video. The WebRTC standard specifies an application programming interface (API) for real-time audio, video, and data communication sessions. Some common web browsers implement this interface. However, signaling channel architecture is not standardized.

SUMMARY

According to one embodiment of the present invention, a system for providing call signaling services to client devices transmits a start channel message on a service topic from a first client device to a service instance. The system publishes from the service instance to a plurality of client devices a channel message including a channel topic. The service instance subscribes to the service topic and a channel topic associated with the service instance, and each of the client devices is subscribed to a corresponding client topic. The system transfers signaling information between the plurality of client devices and the service instance by publishing signaling information to a channel topic and a plurality of client topics to establish a communication channel between the plurality of client devices. The system communicates information between the plurality of client devices by publishing information over the communication channel. Embodiments of the present invention further include a method and computer program product for providing call signaling services in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments provide client systems (e.g., web browsers, mobile devices, etc.) secure, scalable signaling services for real-time communications sessions. Topic-based publish-subscribe messaging is used to establish, maintain, and take down fault-tolerant, bi-directional call signaling channels between endpoint client systems and backend services (e.g., services for multi-way call signaling, broadcast signaling hubs, gateway hubs for bridging to other protocols such as session initiation protocol (SIP) and Extensible Messaging and Presence Protocol (XMPP), etc.).

Each service and client device may be assigned a unique messaging topic name and receive published messages by subscribing to their respective topics. A call signaling service may be represented by a single global service topic name and one or more channel topic names (e.g., one topic name for each server in a cluster hosting the call signaling service). Service instances may be hosted on a cluster of cloned backend servers. Each service instance subscribes to the global service topic name and the channel topic name associated with that service instance. Each client subscribes to its own associated client topic name. Call signaling messages that include information needed to set up a media plane of a real-time communication session are exchanged between clients and services by publishing to the named topics. A directory service may be used to register client and service topic names and associated information (e.g. user names, SIP uniform resource locators (URIs), e-mail addresses, service names, etc.).

One aspect of a present invention embodiment is to provide call signaling that is simpler to program than telecom protocols such as SIP and operates with enterprise web and messaging infrastructures and clients that support WebSockets and the MQ Telemetry Transport (MQTT) messaging protocol. Another aspect is loose coupling of clients and services, making it easier to add new services as needed, and to use simple gateways to traditional telecom infrastructures such as those based on SIP and XMPP.

Figure 1:
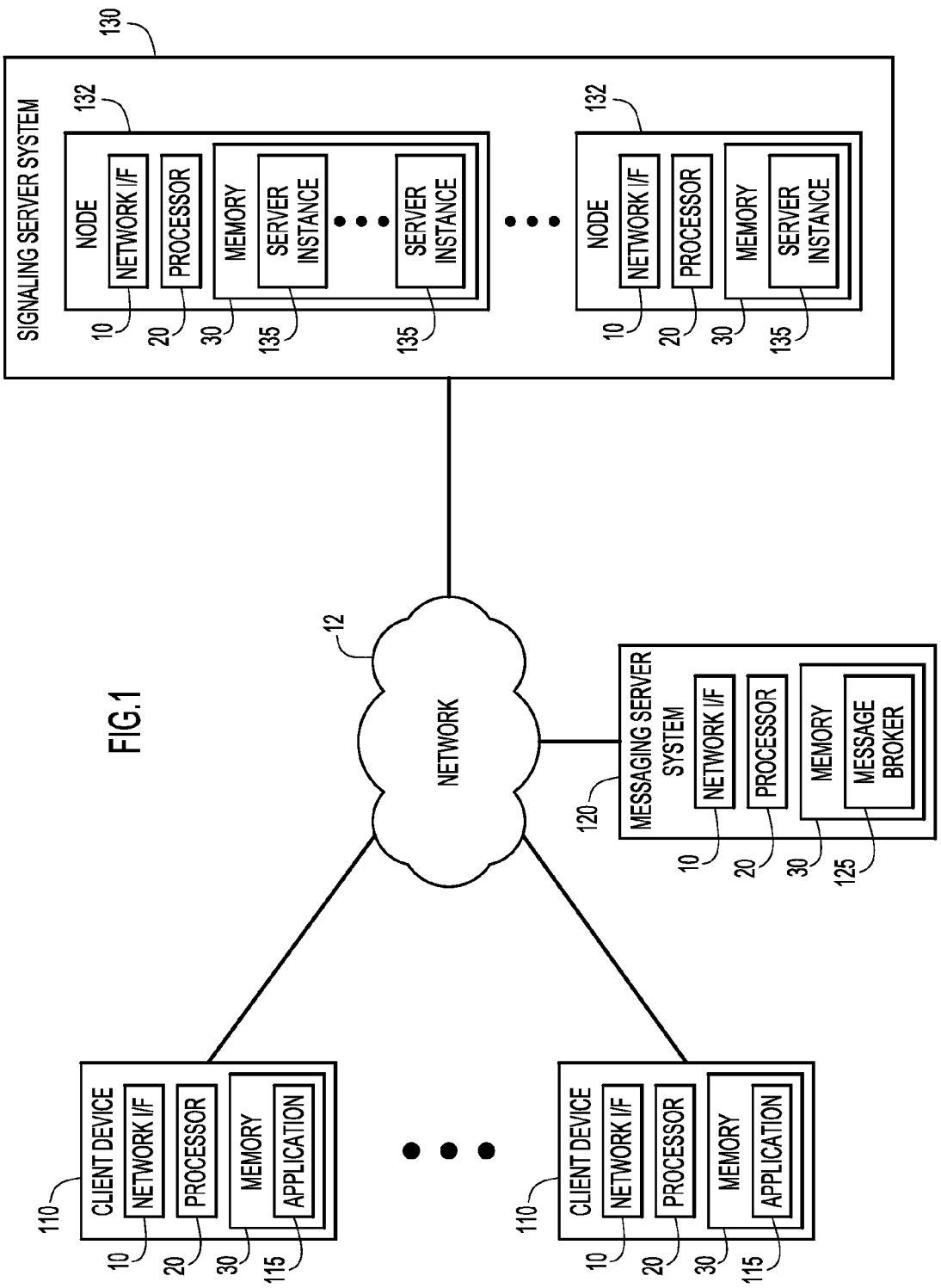
FIG. 1 is a diagrammatic illustration of an example environment for an embodiment of the present invention.

An example environment for present invention embodiments is illustrated in FIG. 1. Specifically, the environment includes one or more client or end-user systems 110, messaging server system 120, and signaling server system 130. Client devices 110, messaging server system 120, and signaling server system 130 may be remote from each other and communicate over a network 12. Network 12 may be implemented by any number of any suitable communications media (e.g., wide area network (WAN), local area network (LAN), Internet, intranet, etc). Alternatively, any number of client devices 110, messaging server system 120, and/or signaling server system 130 may be local to each other, and communicate via any appropriate local communication medium (e.g., local area network (LAN), hardwire, wireless link, intranet, etc.).

Client devices 110 include an application 115 for controlling and participating in a communication session with one or more other client devices 110 or other communication endpoints. Client devices 110 send and receive control messages for a communication session via messaging server system 120 and signaling server system 130. The same mechanism may be used to communicate between service components on the backend. For instance, a conference service may bridge a WebRTC client device with a SIP client device using a SIP gateway service that is listening on its own service topic. The client devices are preferably implemented by web and/or mobile based computing devices and may present any graphical user (e.g., GUI, etc.) or other interface (e.g., command line prompts, menu screens, etc.) to receive commands from users and interact with the application and/or other local or remote modules or services.

Messaging server system 120 includes a message broker 125 that provides a topic based publish-subscribe messaging service to client devices 110 and signaling server system 130. The message broker may be implemented across plural messaging server systems.

Signaling server system 130 provides at least one signaling service (e.g., VOIP, video conferencing, SIP gateway, etc.). The signaling server system may include one or more processing nodes 132 running one or more server instances 135. A server instance may be implemented across plural nodes. Alternatively, signaling server system 130 may be implemented as a single processing system. The server instances may include cloned server instances providing the same signaling service. Each server instance 135 provides one or more signaling channels for corresponding communication sessions between client devices.

In an alternative embodiment, any number of server instances 135, message brokers 125, and/or applications 115 may reside on a common computing system.

Client devices 110, messaging server system 120, and signaling server system 130 may be implemented by any conventional or other computer systems or computing devices optionally equipped with a display or monitor, a base (e.g., including at least one processor 20, memories 30 and/or internal or external network interface or communications devices 10 (e.g., modem, network cards, etc.)), optional input devices (e.g., a keyboard, mouse, touchscreen, or other input device), and any commercially available and custom software (e.g., web browser software, messaging software, real-time communication software, database software, etc.).

Applications 115, message broker 125, and/or server instances 135 may include one or more modules or units (e.g., messaging clients, RTC modules, directory services, etc.) to perform the various functions of present invention embodiments described below (e.g., subscribing to message topics, posting to message topics, determining device communication capabilities, performing signaling for communications sessions, participating in communication sessions, etc.), may be implemented by any combination of any quantity of software and/or hardware modules or units, and may reside within memory 30 of a server system and/or client devices for execution by processor 20.

Figure 2:
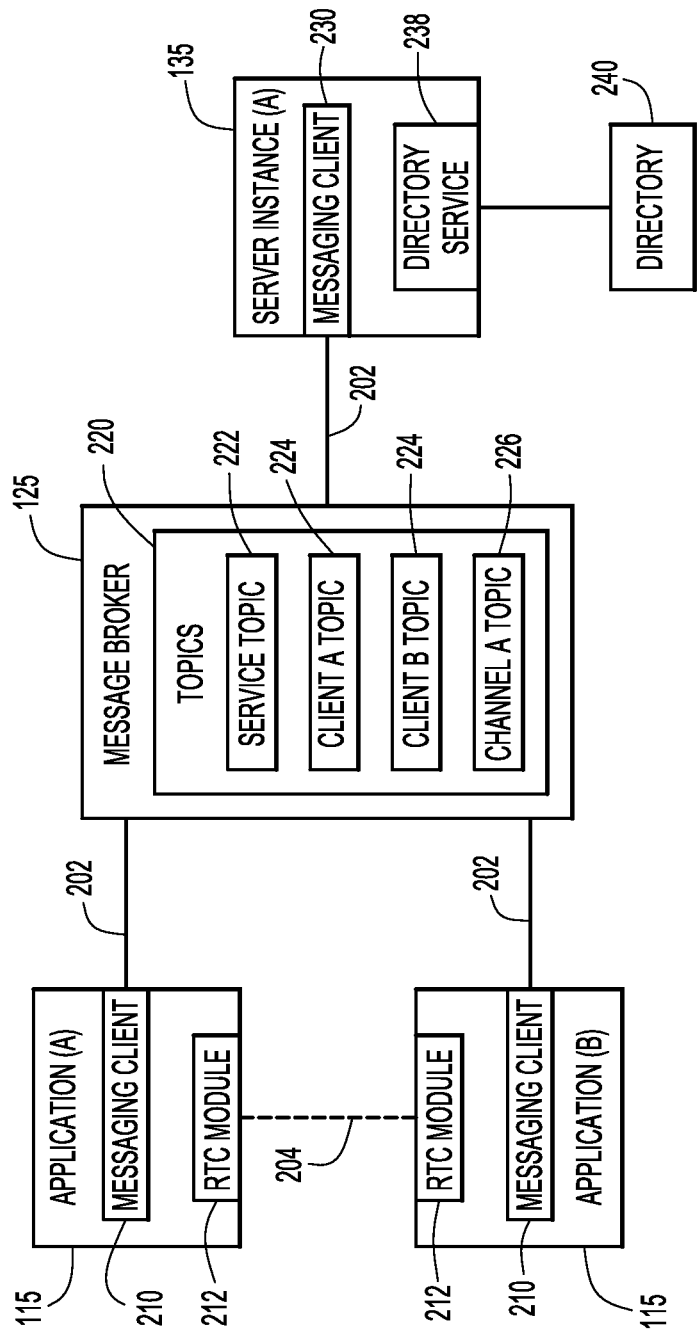
FIG. 2 is a block diagram of example modules for signaling using topic-based, publish-subscribe messaging according to an embodiment of the present invention.

Example modules for call signaling using topic-based, publish-subscribe messaging according to an embodiment of the present invention are illustrated in FIG. 2. In particular, applications 115 (e.g., applications A and B) and server instances 135 (e.g., server instance A) each include a messaging client 210 (e.g., an MQTT client). A messaging client 210 may establish a connection 202 (e.g., a WebSocket connection) to message broker 125. The messaging client may publish a message to a topic by specifying the topic and sending the message to the message broker via the connection.

Applications 115 further include a real-time communication module 212 (e.g., a WebRTC module). Given proper configuration information (e.g., from signaling via the message broker and server instance 135), a real-time communication module 212 may establish a media stream 204 directly or indirectly to another real-time communication module 212 for sending and/or receiving content (e.g., text, audio, video, data, etc.).

Message broker 125 maintains a list of topics 220 and information about clients subscribed to each topic. When a message is published, the message broker sends the message to each messaging client subscribed to the message topic (e.g., via a connection 202). Topics 220 include at least one service topic 222, client topics 224, and channel topics 226. For each service (e.g., signaling for VOID, signaling for video conferencing, SIP gateway, etc.) provided by signaling server system 130 there is a single service topic 222. Each application 115 has a corresponding client topic 224 to which it subscribes (e.g., application A may subscribe to a topic named "client A," application B may subscribe to a topic named "client B," etc.). In addition, each server instance 135 has a corresponding channel topic 226 to which it subscribes (e.g., server instance A may subscribe to a topic "channel A").

Server instances 135 may further include a directory service module 238. The directory service module may access a local or remote directory 240 to associate identifiers of client devices, applications, and/or users with client or topic names, credentials, and/or other information (e.g. user names, SIP uniform resource locators (URIs), e-mail addresses, service names, etc.).

Figure 3:
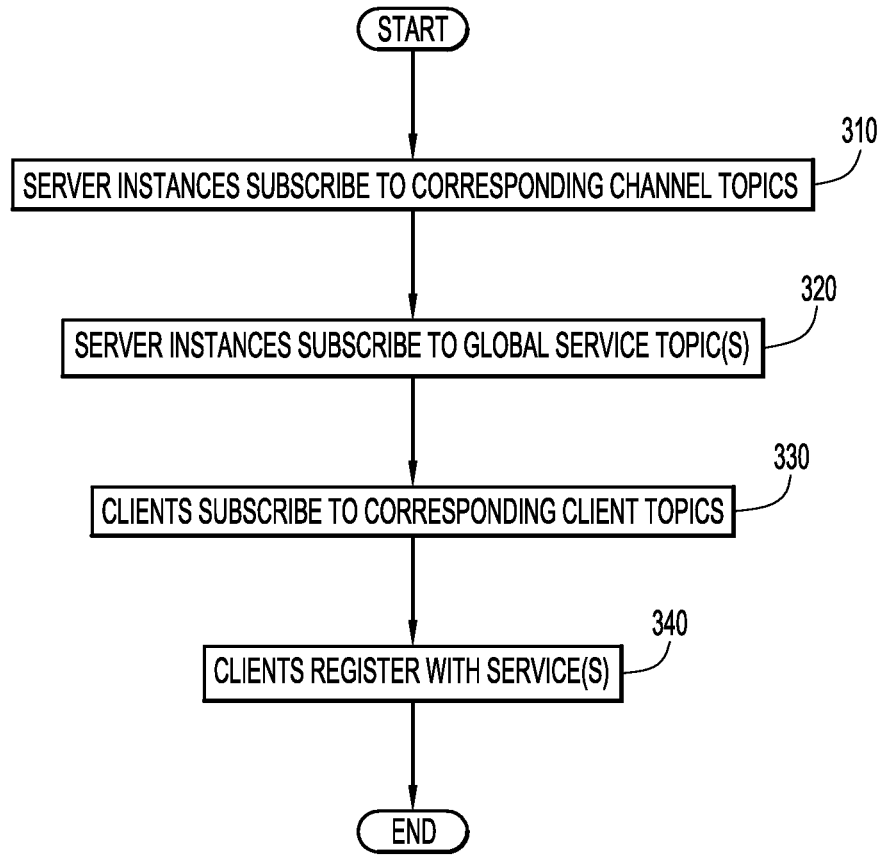
FIG. 3 is a flow diagram illustrating an example manner of configuring a messaging based signaling system according to an embodiment of the present invention.

An example manner of configuring a messaging based signaling system according to an embodiment of the present invention is illustrated in FIG. 3. In particular, at step 310, server instances 135 subscribe to their corresponding channel topics 226. At step 320, each server instance subscribes to the single global service topic 222 for the service that server instance provides. Service topic 222 is configured for shared subscriptions; that is, when a message is published to the service topic, message broker 125 will select (using, e.g., a round-robin or other load-balancing algorithm) one of the server instances subscribed to the topic, and deliver the message to the selected server instance. Accordingly, a plurality of service instances (e.g., cloned instances) providing the same service may be subscribed to a single global service topic, while each individual service instance is subscribed to its own respective channel topic.

At step 330, each client device (e.g., via application 115 and messaging client 210) subscribes to a corresponding client topic 224. Optionally, at step 340, client devices may register with one or more of the services provided by the signaling server system. For example, a client device may provide a user or client device identifier, a password, a client topic name, and/or other information to the signaling server system, which may store the information in directory 240.

Figure 4:
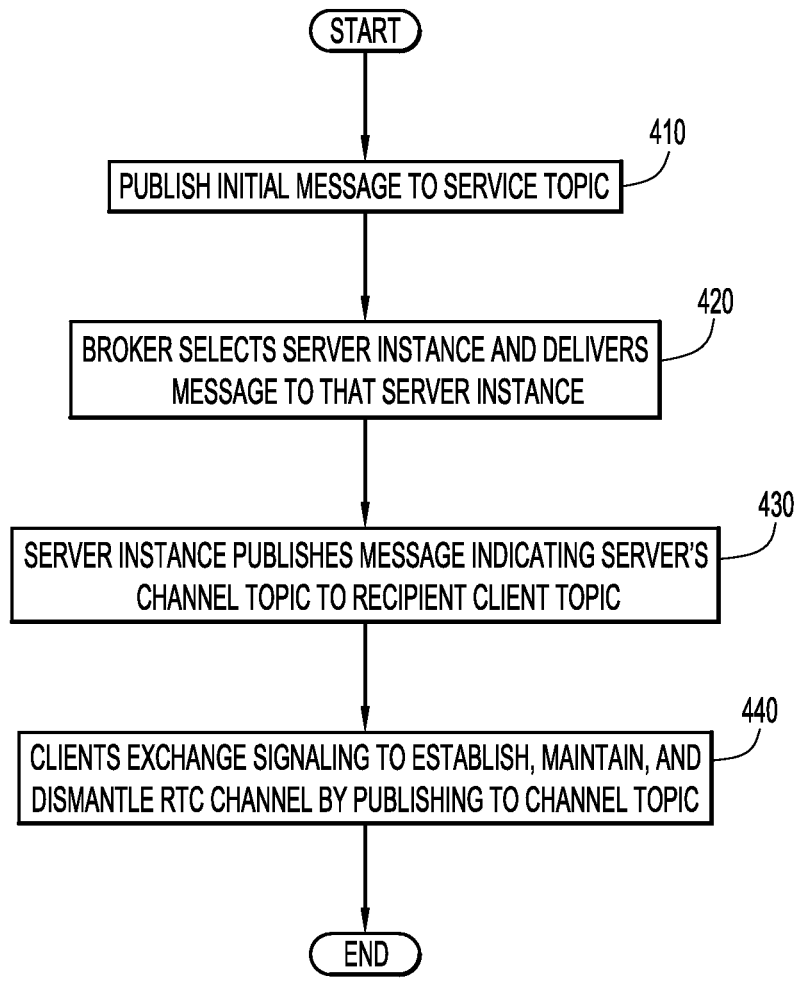
FIG. 4 is a flow diagram illustrating an example manner of providing signaling for a communication session according to an embodiment of the present invention.

An example manner of providing signaling for a communication session according to an embodiment of the present invention is illustrated in FIG. 4. Initially, at step 410, a message (referred to as the start channel message) is published (e.g., by a client device 110) to a service topic 222 to establish a signaling channel for a new desired real-time communication session. The start channel message may include signaling information for setting up the RTC session (e.g., identifiers of one or more client devices to be invited to the communication session, a session identifier, candidate codecs, etc.).

At step 420, message broker 125 receives the start channel message, selects a server instance 135 subscribed to the service topic, and delivers the message to the selected server instance. As a result, only one of the server instances subscribed to the service topic receives the start channel message.

At step 430, the server instance publishes a message containing the name of the server instance's channel topic to the client topic of each client device invited to participate (by, e.g., the start channel message or a subsequent request). This indicates that the participating client devices should publish subsequent messages for the signaling session to that channel topic. As a result, the same selected server instance mediates all of the signaling for the session even if two or more server instances are subscribed to the same service topic. Accordingly, a signaling server system 130 may comprise a scalable cluster of nodes running a plurality of server instances and provide a high availability of signaling channels and/or increased signaling capacity.

The message or messages by which the server instance notifies invited client devices of the channel topic may include signaling information for the prospective communication session (e.g., information included in the start message or subsequent messages, such as identifiers of one or more client devices to be invited to the communication session, a session identifier, candidate codecs, etc.).

The server instance may reach an invited client device using a service in substantially the same manner in which a client device uses a service. For example, a server instance of a conference service may bridge a first client device using a one protocol (e.g., WebRTC) with a second client device using another protocol (e.g., SIP) by publishing a first message for the second client device to a service topic subscribed to by a gateway service for the protocol of the second device (e.g., A SIP gateway service). A server instance of the gateway service will respond (by posting to the conference server instance's channel topic) with a message including a channel topic for the gateway server instance. The conference server instance will send subsequent messages to the second client device by publishing to the gateway server instance's channel topic.

At step 440, the participating client devices exchange signaling information for establishing, maintaining, and concluding a media plane in a real-time communications media session by publishing messages to the channel topic. The message broker delivers these messages to the server instance, which in turn may direct these or other messages to participating client devices by publishing messages to their respective client topics or to another service or channel topic (e.g., for a gateway service). The channel topic for the selected service instance and the client topics for the participating client devices are thereby used to form a logical grouping of communication channels 202 for signaling communications among the group of participating client devices. The client devices may keep the signaling channel and session active by publishing keep-alive messages to the channel topic. As a result, if a client or server is lost, the session state may be properly cleaned up.

Figure 5:
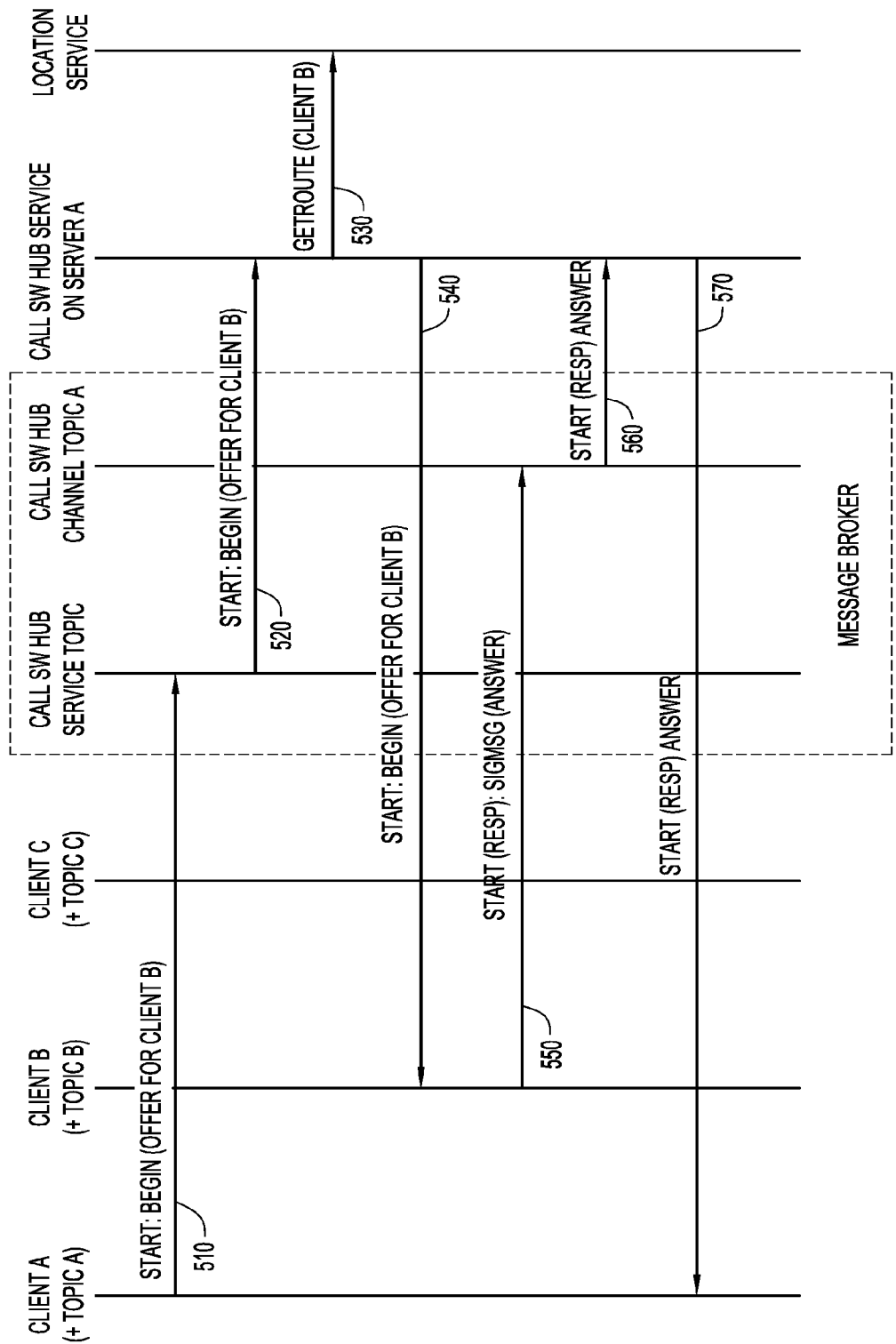
FIG. 5 is a block diagram illustrating an example message sequence for call signaling according to an embodiment of the present invention.

An example sequence of message transmissions for call signaling according to an embodiment of the present invention is illustrated in FIG. 5. Initially, at step 510, a first client device 110 (client A) publishes a start message to a service topic to request an audio-video communication session with a second client device (client B). Specifically, client A sends the start message to the message broker. The start message may include an identifier of client B (e.g., an email address, SIP URI, etc.), profile information for a real-time communication session (e.g., IP address, port, available codecs, etc.), login credentials for client A, and the like.

The message broker selects a server instance A to receive the start message, and sends the message to server instance A at step 520. Server instance A receives the start message, determines that the message is intended for client B, and retrieves the client topic name ("Client B") associated with client B from the directory service at step 530. Server instance A adds its channel topic name ("Channel A") to the message to indicate that client devices should publish subsequent messages for this signaling session to that channel topic. At step 540, server instance A publishes the message to the topic "Client B" by sending the message to the message broker. The message broker receives the message and sends the message to client B (since client 13 is subscribed to its associated topic). Client B receives the message, forms a response message, and publishes the response message to the indicated channel topic ("Channel A") at step 550. The message broker receives the response message from client B and forwards the response message to the "Channel A" subscriber, server instance A, at step 560. At step 570, server instance A sends the response to client A by via the message broker by publishing the response to the client topic name associated with client A. If the response is favorable, client A may establish a media stream 204 to client B for communications. Additional participants may be added to the session in substantially the same manner described above.

It will be appreciated that the embodiments described above and illustrated in the drawings represent only a few of the many ways of implementing embodiments for signaling services for real-time communications sessions.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client devices. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise, it will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the users computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for providing call signaling services to client devices comprising:
   at least one processor and memory configured to:
   transmit a start channel message on a service topic from a first client device to a service instance;
   publish from the service instance to a plurality of client devices a channel message including a channel topic, wherein the service instance subscribes to the service topic and a channel topic associated with the service instance, and wherein each of the client devices is subscribed to a corresponding client topic;
   establish a communication channel between the plurality of client devices by transferring signaling information between the plurality of client devices and the service instance, wherein the transferring includes publishing signaling information to a channel topic and a plurality of client topics to establish the communication channel between the plurality of client devices; and
   communicate information between the plurality of client devices over a network via one or more from a group of a wired connection and a wireless connection by publishing information over the communication channel.

2. The system of claim 1, wherein a client device includes at least one of a mobile device and a web device.

3. The system of claim 1, wherein the at least one processor and memory are further configured to:
   provide a logical grouping of communication channels using a single channel topic and a plurality of client topics for group communications.

4. The system of claim 1, wherein transferring signaling information between the plurality of client devices and the service instance comprises:
   publishing signaling information for a second client device to a service topic of a gateway service;
   receiving a gateway channel topic for a service instance of the gateway service; and
   publishing signaling information for the second client device to the gateway channel topic.

5. The system of claim 4, wherein the gateway service is a selected one of a SIP gateway service and an XMPP gateway service.

6. The system of claim 1, wherein the at least one processor and memory are further configured to:
   register service topics and client topics with a directory service.

7. The system of claim 6, wherein the service and client topics to establish the communication channel include at least one of user names, URIs, e-mail addresses, and service names.

8. The system of claim 1, wherein the at least one processor and memory are further configured to:
   maintain the communication channel in an active state by publishing one or more messages from a client device to the service instance.

9. The system of claim 1, wherein a plurality of service instances are associated with a common single global shared topic, and each individual service instance is associated with a single channel topic to provide at least one of high availability of communication channels, increased communication capacity, and clustering of service instances.

10. The system of claim 1, wherein the client devices regularly publish keep-alive messages to the channel topic to maintain the communication channel and a communication session state.

11. A computer program product for providing call signaling services to client devices comprising:
a computer readable storage medium having computer readable program code embodied therewith for execution on a processing system, the computer readable program code comprising computer readable program code configured to:
transmit a start channel message on a service topic from a first client device to a service instance;
publish from the service instance to a plurality of client devices a channel message including a channel topic, wherein the service instance subscribes to the service topic and a channel topic associated with the service instance, and wherein each of the client devices is subscribed to a corresponding client topic;
establish a communication channel between the plurality of client devices by transferring signaling information between the plurality of client devices and the service instance, wherein the transferring includes publishing signaling information to a channel topic and a plurality of client topics to establish the communication channel between the plurality of client devices; and
communicate information between the plurality of client devices over a network via one or more from a group of a wired connection and a wireless connection by publishing information over the communication channel.

12. The computer program product of claim 11, wherein a client device includes at least one of a mobile device and a web device.

13. The computer program product of claim 11, wherein the computer readable program code is further configured to: provide a logical grouping of communication channels using a single channel topic and a plurality of client topics for group communications.

14. The computer program product of claim 11, wherein transferring signaling information between the plurality of client devices and the service instance comprises:
publishing signaling information for a second client device to a service topic of a gateway service;
receiving a gateway channel topic for a service instance of the gateway service; and
publishing signaling information for the second client device to the gateway channel topic.

15. The computer program product of claim 14, wherein the gateway service is a selected one of a SIP gateway service and an XMPP gateway service.

16. The computer program product of claim 11, wherein the computer readable program code is further configured to:
register service topics and client topics with a directory service.

17. The computer program product of claim 16, wherein the service and client topics to establish the communication channel include at least one of user names, URIs, e-mail addresses, and service names.

18. The computer program product of claim 11, wherein the computer readable program code is further configured to:
maintain the communication channel in an active state by publishing one or more messages from a client device to the service instance.

19. The computer program product of claim 11, wherein a plurality of service instances are associated with a common single global shared topic, and each individual service instance is associated with a single channel topic to provide at least one of high availability of communication channels, increased communication capacity, and clustering of service instances.

20. The computer program product of claim 11, wherein the client devices regularly publish keep-alive messages to the channel topic to maintain the communication channel and a communication session state.

* * * * *